(12) United States Patent
Comin et al.

(10) Patent No.: US 12,431,984 B2
(45) Date of Patent: Sep. 30, 2025

(54) METHOD, OPTICAL RECEIVER, QKD PULSE STREAM AND QKD SYSTEM

(71) Applicant: Airbus SAS, Blagnac (FR)

(72) Inventors: Alberto Comin, Blagnac (FR); Nils Hellerhoff, Blagnac (FR)

(73) Assignee: Airbus SAS, Blagnac (FR)

( * ) Notice: Subject to any disclaimer, the term of this patent is extended or adjusted under 35 U.S.C. 154(b) by 126 days.

(21) Appl. No.: 18/536,998

(22) Filed: Dec. 12, 2023

(65) Prior Publication Data

US 2024/0204886 A1 Jun. 20, 2024

(30) Foreign Application Priority Data

Dec. 16, 2022 (EP) .................................. 22214395

(51) Int. Cl.
*H04B 10/70* (2013.01)
*H04L 9/08* (2006.01)

(52) U.S. Cl.
CPC ........... *H04B 10/70* (2013.01); *H04L 9/0852* (2013.01)

(58) Field of Classification Search
CPC ... H04B 10/70; H04B 10/6162; H04L 9/0852; H04L 9/0858
See application file for complete search history.

(56) References Cited

U.S. PATENT DOCUMENTS 11,212,012 B2 * 12/2021 Xu .............................. H04L 9/00

FOREIGN PATENT DOCUMENTS

GB          2550263 A       11/2017
WO   WO-2006039097 A2 *  4/2006    ............ H04B 10/70

OTHER PUBLICATIONS

European Search Report for corresponding European Patent Application No. 22214395.0 dated Jun. 9, 2023; priority document.
T. Kupko et al., "Tools for the Performance Optimization of Single-Photon Quantum Key Distribution" Quantum Information, vol. 6, No. 1., Dec. 1, 2020.
T. Occhipinti et al., "The Importance of Time and Frequency Reference in Quantum Astronomy and Quantum Communications" 2007—Proceedings of the 39th Annual Precise Time and Time Interval Meeting, The Institute of Navigation, Manassas, VA (USA), Nov. 29, 2007; pp. 459-476.
Z. Ping-Ping et al., "A New Synchronization Scheme Based on Time Division Multiplexing and Wavelength Division Multiplexing Technology for Practical Quantum Key Distribution System" Chinese Physics B, Chinese Physics B, Bristol GB, vol. 20, No. 5, May 17, 2011; p. 50307.

(Continued)

*Primary Examiner* — Brian Whipple
(74) *Attorney, Agent, or Firm* — Greer, Burns & Crain, Ltd.

(57) ABSTRACT

A method for Quantum Communication, including the steps: obtaining, by a detector, a base signal, wherein the base signal includes an indication of a background optical noise of a communication channel; determining, based on the obtained base signal, a width of a time gate value; applying to the detector the determined width of time gate; and obtaining a QKD signal including QKD signal pulses sent through the communication channel by applying the time gate having the determined width for filtering the background optical noise. A corresponding optical receiver, QKD pulse stream and QKD system for quantum communication are also provided.

15 Claims, 6 Drawing Sheets

(56) References Cited

OTHER PUBLICATIONS

C. Bonato et al., "Some Aspects on the Feasibility of Satellite Quantum Key Distribution" ARXIV.org, Cornell University Library, Ithaca, NY (USA), Mar. 12, 2009.
S. Nauerth "Air to Ground Quantum Key Distribution" retrieved from https://edoc.ub.uni-muenchen.de/16222/1/Nauerth_Sebatian.pdf; Jan. 1, 2013.
S. Kish et al., "Use of a Local Local Oscillator for the Satellite-to-Earth Channel" ARXIV.org, Cornell University Library, Ithaca, NY (USA), Oct. 19, 2020.
H-K Lo, et al., "Decoy State Quantum Key Distribution" Center for Quantum Information and Quantum Control, Department of Electrical & Computer Engineering and Department of Physics, University of Toronto, Toronto, Ontario Canada; 5 pages.

\* cited by examiner

METHOD, OPTICAL RECEIVER, QKD PULSE STREAM AND QKD SYSTEM

CROSS-REFERENCES TO RELATED APPLICATIONS

This application claims the benefit of the European patent application No. 22214395.0 filed on Dec. 16, 2022, the entire disclosures of which are incorporated herein by way of reference.

FIELD OF THE INVENTION

The present invention is directed to a method for quantum communication and a corresponding optical receiver, a QKD encoded pulse stream and a QKD system for quantum communication.

BACKGROUND OF THE INVENTION

When the airborne or space platform moves and changes its orientation, a quantum key distribution (QKD) communication terminal receives a varying amount of background radiation. This radiation typically is filtered out in order to detect the single photons of a QKD signal transmitted by the QKD communication partner. A method for filtering is time-filtering the incoming QKD signal photons. This can be implemented by hardware means, e.g., a time gated photon counter, or via software during post-processing. Typically, the gate width for filtering the signal is decided in advance, e.g., according to an expected pulse duration.

In space-ground QKD links, a satellite in low orbit traverses the sky in a few minutes and the background radiation is very different when the satellite is near the horizon or at the zenith. Aircraft-ground links could also have a background radiation level depending on the flight trajectory. Therefore, background radiation changes significantly in a short time frame. Therefore, there is a need to provide means for improved filtering of the background optical noise from the QKD signal photons.

SUMMARY OF THE INVENTION

According to a first aspect of the invention, a method for quantum communication is provided. The method comprises obtaining, by a detector, a base signal, wherein the base signal includes an indication of a background optical noise of a communication channel; determining based on the obtained base signal a width of a time gate value; applying to the detector the determined width of time gate; and obtaining a QKD signal comprising QKD signal pulses sent through the communication channel by applying the time gate having the determined width for filtering the background optical noise.

According to a second aspect of the invention, an optical receiver for quantum communication is provided. The optical receiver is, in particular, capable of performing the method of the present invention. The optical receiver comprises: a detector configured to detect a QKD signal comprising QKD signal pulses sent through a communication channel and a base signal, wherein the base signal includes an indication of a background optical noise in the communication channel; a controller connected to the detector, wherein the controller is configured to: determine based on the obtained base signal a width of a time gate; and apply the determined width of the time gate to the detector for obtaining the QKD signal pulses by temporal filtering.

According to a third aspect of the invention, a QKD encoded pulse stream for quantum communication is provided. The QKD encoded pulse stream comprises QKD encoded pulses arranged in predetermined equal pulse intervals, wherein the QKD encoded pulses comprise: marker pulses spaced apart at a predetermined time period; and QKD signal pulses arranged between the marker pulses; wherein the marker pulses have at least one first level of a mean number of photons different than a level of the mean number of photons of the QKD signal pulses.

According to a third aspect of the invention, a QKD system for quantum communication is provided. The QKD system comprises the inventive optical receiver and an optical transmitter configured to emit the inventive QKD encoded pulse stream towards the optical receiver.

A fundamental concept of the invention is to provide an automatic filtering of the background optical noise in order to improve the quality of the QKD signal. For this, the present invention is particularly directed to time-filtering using a temporal gate, which functions by selecting only the light coming at specific moments in time. In addition, the present invention also applies spectral filtering the QKD signal from the background optical noise by their wavelength. Furthermore, the present invention also applies stray-light minimization by optically shielding the receiver, and angle of incidence filtering using spatial-filters to select only the light coming from the transmitter.

According to this invention, a base signal is obtained that provides information about the background optical noise in the communication channel, the QKD signal is sent through. This base signal is then processed by the controller or, as will be described below in further details, by a neural network, in order to determine a width of a time gate for filtering the QKD signal pulses out of the background optical noise. In general, the width may be close to the pulse width of the QKD signal pulse, however, this method aims to optimize this width for improving the key rate. A base for such optimization could be provided, for example, by analytical models, such as provided by H-K Lo et al., "Decoy State Quantum Key Distribution," 2005, Phys. Rev. Lett. 94, 230504, arXiv:quant-ph/0411004, which considers the 8884 QKD protocol with decoy states. Other sources algorithms may be applied for this function as well.

A particular advantage in the solution according to an aspect of the invention is that the invention allows to improve the key rate of QKD communication terminals deployed on airborne and spaceborne platforms. The specific advantages are: a key rate is further improved, ideally maximized automatically. This is important for QKD terminals mounted on low orbit satellites, where the amount of background radiation depends on the position along the orbit. This is also applicable for QKD terminals mounted on, e.g., unmanned air vehicles, aircrafts, or high altitude platforms, where the flying path can be different each time. Furthermore, the time-gating parameters self-adjust automatically, even when the parameters of the QKD source change, for example when the temporal duration or the amplitude (average photon number) of the pulses change. In addition, in case an adversary attempts to send strong flashes of light towards the QKD receiver, the time gate can be automatically narrowed, in order to reject as much as possible, the jamming light pulses. Therefore, the solution of the present invention makes QKD links more resilient against jamming.

Advantageous embodiments and further developments emerge from the description with reference to the figures.

According to a further aspect of the present invention, the method further comprises to determine a quantum bit-error-rate, QBER, of the communication channel based on the obtained base signal. The QBER in this invention is understood as its general meaning. Generally, the QBER is defined as the ratio of an error rate to the key rate, wherein a quantum bit, qubit, is the basic unit of quantum information.

For encoding the qubit, a two level quantum system or a multi-level system can be applied. The QBER thus gives an indication about the quality of the secure data rate of the QKD signal. Determining the QBER, the determination of the width of the time gate is further based on the determined QBER.

In the case of, e.g., free-space QKD terminals using polarization encoding, a one-to-one correspondence between the QBER and background radiation level or background optical noise may not be sufficiently precise anymore. In such case, the background optical noise coming from stray light can be much more significant than detector dark-counts, and it can also be partly polarized. Therefore, by measuring both the QBER and the background optical noise and feeding this to the determination of the width of the time gate, an improved filtering of the background optical noise is achieved.

According to a further aspect of the present invention, the step of determining the width of the time gate is performed by a neural network. The neural network aims to predict the optimal gate width, which should give the highest key rate. Since the neural network is run in a prediction mode, the determination of the width is much faster than a QKD post-processing procedure. This is particularly beneficial when using a hardware gating, which is needed for relatively "noisy" detectors, such as the Avalanche Photodiodes (APD) operating at the telecom wavelength 1550 nm.

According to a further aspect of the present invention, the method further comprises inputting a base signal indicating the background noise and the QBER into the neural network for training the neural network. The neural network is trained initially with simulated data, and then progressively during an operation of the receiver when QKD communication is performed, performance parameters are fed to the neural network. This improves the quality of prediction, i.e., determination of the width of the time gate by the neural network.

According to a further aspect of the present invention, the method further comprises a determination of the actual key rate of the obtained QKD signal pulses. The key rate is understood as the rate of the generation of a key used for encrypting a classical communication link by this key. The method further comprises inputting the determined actual key rate into the neural network for training the neural network. This provides further feedback on a target parameter for the neural network for optimizing the width of the time gate.

According to a further aspect of the present invention, the base signal comprises marker pulses temporally spaced apart from each other by a predetermined marker time period and interspersed into the QKD signal such that the marker pulses and the QKD signal pulses form a QKD encoded pulse comprising QKD encoded pulses having predetermined equal pulse intervals. The marker pulses are thus at predefined positions so that the QKD receiver can easily distinguish the marker pulses from the normal QKD signal pulses. The markers can be distinguished from the QKD signal pulses by using time stamps given by a time-tagger. The QKD receiver can measure the marker pulses with the same detector which is used for the QKD signal. A mean, i.e., average, number of photons or amplitude of the marker pulses is different from a mean number of photons of the QKD signal pulses. The marker pulses within the QKD encoded pulse stream can thus be easily distinguished from the QKD signal pulses and being analyzed for the background optical noise including its disturbance on the quantum state of the marker pulses.

According to a further aspect of the present invention, the marker pulses comprise high-intensity marker pulses and low-intensity marker pulses, wherein a mean number of photons of the high-intensity marker pulses is higher than a mean number of photons of the QKD signal pulses, wherein a mean number of photons of the low-intensity marker pulses is lower than the mean number of photons of the high-intensity marker pulses. The mean number of photons of the marker pulse or the QKD signal pulse may also be defined as its amplitude or intensity. In particular, the high-intensity pulses are suitable for characterizing a quantum state property, such as the polarization, of the communication channel, whereas the low-intensity pulses are suitable to estimate the QBER. This information may then be applied to dynamically determine and adjust the time-gating parameters without relying on a separate classic communication channel. This solution thus avoids the communication latency associated with the exchange of information on the classic channel and enables real-time adjustments.

According to a further aspect of the present invention, the marker pulses comprise at least first marker pulses having a first polarization state and second marker pulses having a second polarization state different from the first polarization state.

In this way, the marker pulses provide an indication of disturbances in a polarization state in the communication channel. This is particularly useful for QKD signals using polarization quantum systems or encoding schemes, such as the classical BB84 scheme.

According to a further aspect of the present invention, the base signal and the QKD signal pulses are arranged in a sequence of a header prior to a QKD package, wherein the header, in particular, comprises the marker pulses and the QKD package comprises the QKD signal pulses. Since the header contains information on the background optical noise, the header can be applied for key rate optimization. Furthermore, combining this solution with the marker pulses results in an easier discrimination of the base signal and the QKD signal.

According to a further aspect of the present invention, the marker pulses are spaced apart from each other according to a pseudo-random sequence. For example, a pseudo-random sequence could be based on digits of 10 times the Greek pi, or a multiple of them, such that the first marker pulse would be arranged after 30 photons, the second marker pulse after 10 photons, the third after 40 photons, etc. This aspect avoids the risk of cross-talk between the marker pulses and the QKD signal pulses.

According to a further aspect of the present invention, the optical receiver further comprises an optical filter unit for spectral filtering the base signal from the QKD signal pulses. The filter unit particularly comprises is a fiber-based demultiplexer, a dichroic beam splitter and/or a bandpass filter, or a combination thereof. These provide means for effective spectral filtering of the base signal from the QKD signal pulses down to the bandwidth of the pulse, which may be limited by the pulse width. The detector comprises a first detection unit for detecting the QKD signal pulses and a second detection unit for detecting the base signal. With separate detection units, the background optical noise can be quantified in an improved way.

According to a further aspect of the present invention, the optical receiver further comprises a neural network. The neural network is configured to determine the width of the time gate based on a QBER and on the base signal. As described above, this renders the determination of the width to be much faster than a QKD post-processing procedure. The controller particularly is configured to input the base signal indicating the background noise and the QBER into the neural network for training the neural network. This improves the quality of prediction, i.e., determination of the width of the time gate by the neural network.

The above aspects can be combined with each other as desired, if useful. In particular, all features of the method for quantum communication are transferable to the optical receiver, and, where appropriate, to the QKD pulse stream, and vice versa. Further possible embodiments, further developments and implementations of the invention also comprise combinations, not explicitly mentioned, of features of the invention described before or below with respect to the embodiments. In particular, the skilled person will thereby also add individual aspects as improvements or additions to the respective basic form of the present invention.

BRIEF DESCRIPTION OF THE DRAWINGS

The present invention is explained in more detail below with reference to the embodiments shown in the schematic figures.

In the figures of the drawing, elements, features and components which are identical, functionally identical and of identical action are denoted in each case by the same reference designations unless stated otherwise.

DETAILED DESCRIPTION OF THE PREFERRED EMBODIMENTS

Figure 1:
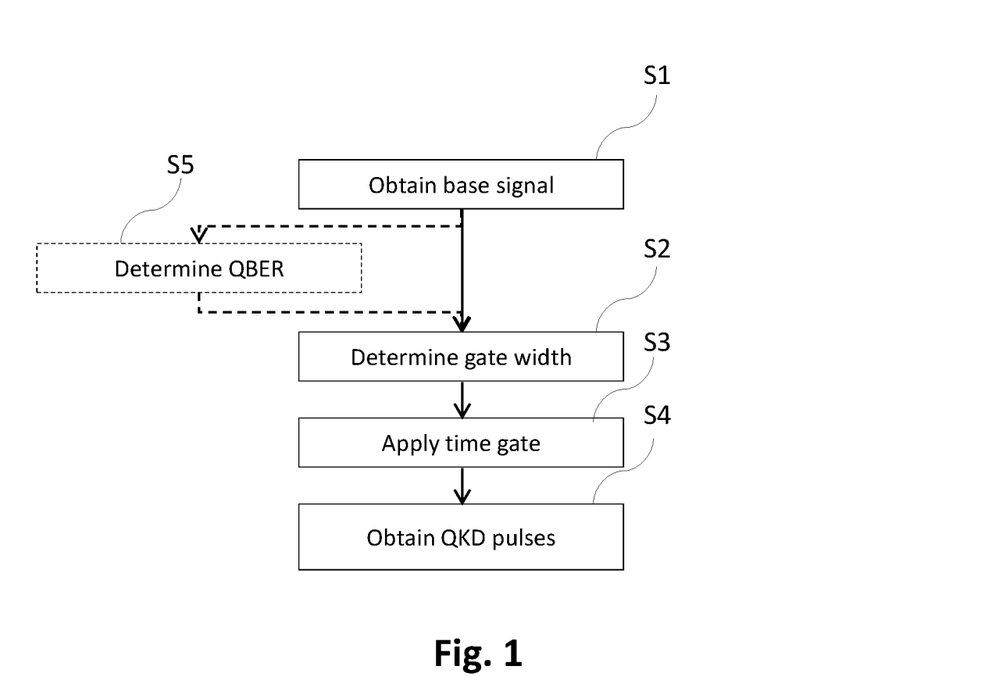
FIG. 1 shows a schematic illustration of a method for quantum communication according to an embodiment of the invention.

FIG. 1 shows a schematic illustration of a method for quantum communication according to an embodiment of the invention.

The method for quantum communication shown in FIG. 1 comprises the step of obtaining S1, by a detector 2, a base signal 5, wherein the base signal 5 includes an indication of a background optical noise of a communication channel 10.

The method further provides the step of determining S2 based on the obtained base signal 5 a width W of a time gate value G. The method further provides the step of applying S3 to the detector 2 the determined width W of time gate G. Additionally, the step of obtaining S4 a QKD signal 3 comprising QKD signal pulses 4 sent through the communication channel 10 by applying the determined width W time gate G for filtering the background optical noise is provided.

An optional step of determining a quantum bit-error-rate, QBER, of the communication channel 10 based on the obtained base signal 5, may be provided. Consequently, the determination of the width W of the time gate G is based on the determined QBER. This additional step further improves the accuracy of the determined width of time gate, which leads to an improved key rate.

In the following figures, the method is explained in detail by a related optical receiver 1 and/or the QKD signal 3.

Figure 2:
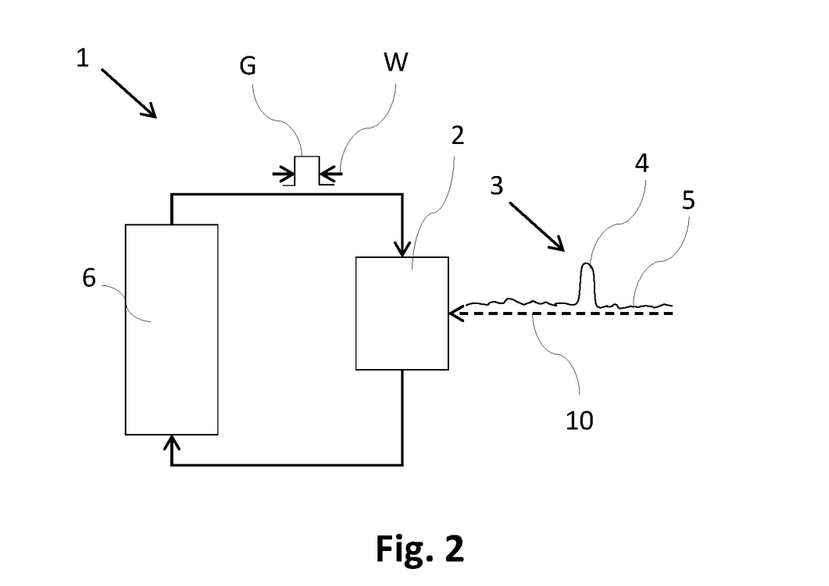
FIG. 2 shows a schematic illustration of an optical receiver for quantum communication according to an embodiment of the invention.

FIG. 2 shows a schematic illustration of an optical receiver 1 for quantum communication according to an embodiment of the invention.

The optical receiver 1 for quantum communication shown in FIG. 1 is, in particular, capable to perform the method for quantum communication as described above. The optical receiver 1 comprises a detector 2 configured to detect a QKD signal 3 comprising QKD signal pulses 4 sent through a communication channel 10 and a base signal 5, wherein the base signal 5 includes an indication of a background optical noise in the communication channel 10. The optical receiver 1 further comprises a controller 6 connected to the detector 2. The controller 6 is configured to determine, based on the obtained base signal 5, a width W of a time gate G. This is based on an analytical model, which is described in further detail below. The controller 6 is further configured to apply the time gate G having the determined width W to the detector 2 for obtaining the QKD signal pulses 4 by temporal filtering. The time gate G is applied to the detector 2 at the time, the QKD signal pulse 4 is incident. The application of the time gate can be performed by hardware, e.g., gain switching, or by software, e.g., by a post-processing procedure performed by a CPU (not shown).

Figure 3:
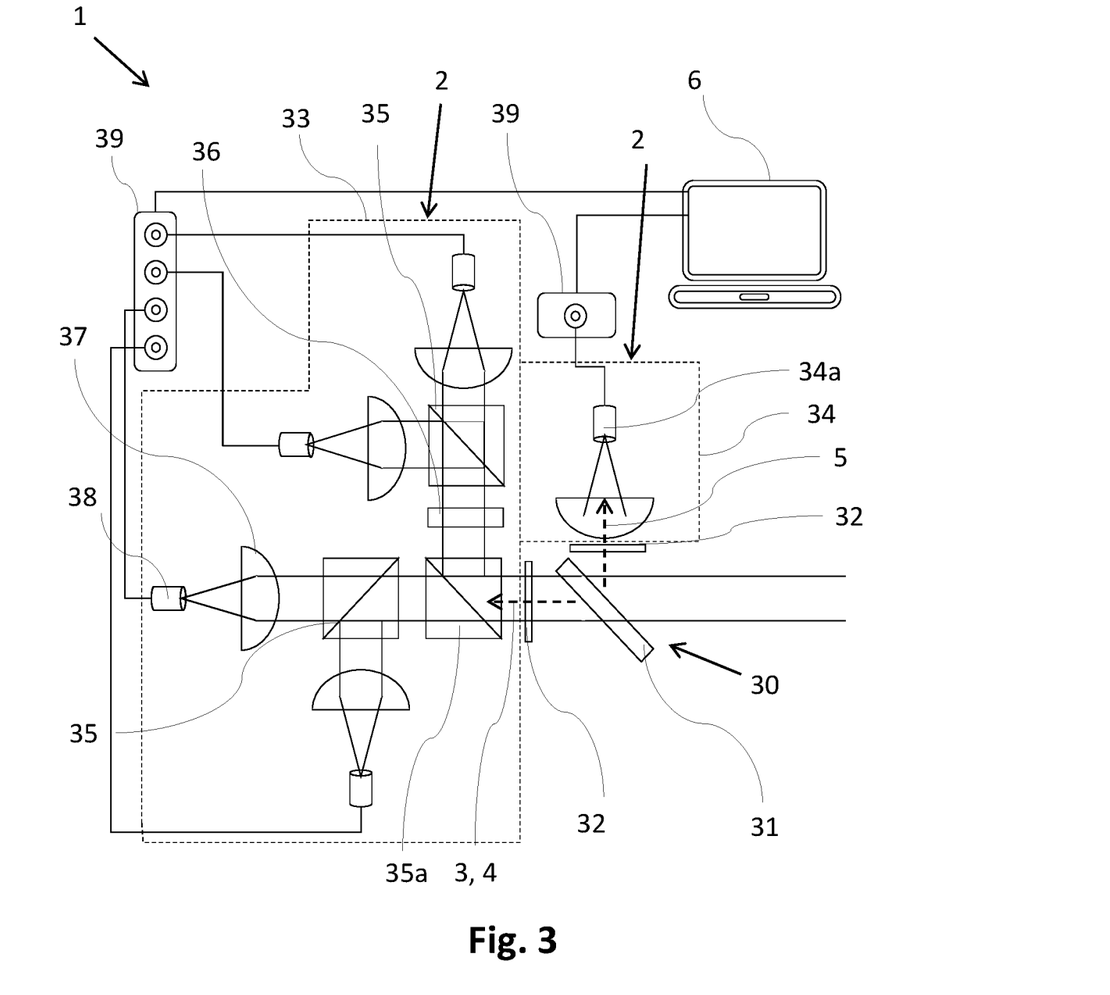
FIG. 3 shows a schematic illustration of an optical receiver for quantum communication according to a further embodiment of the invention.

FIG. 3 shows a schematic illustration of an optical receiver 1 for quantum communication according to a further embodiment of the invention.

The optical receiver 1 further comprises an optical filter unit 30 comprising a dichroic beam splitter 31 and two bandpass filters 32 for spectral filtering the base signal 5 from the QKD signal pulses 4. In further embodiments, a fiber-based narrow band demultiplexer is contained in the filter unit 30. The detector 2 further comprises a first detection unit 33 for detecting the QKD signal pulses 4. In this case, polarization encoded according to the BB84 protocol has been employed, and therefore, the detection unit 33 is a standard setup which comprises three beam splitters 35, 35a, and a half waveplate 36 for discriminating the four linear polarization states horizontal (e.g., 0°), vertical (90°), plus (+45°), minus (−45°). For this, the first beam splitter 35a in the detection unit 33 is a non-polarizing beam-splitter 35a and the other two beam splitters 35 are polarizing beam splitters 35 configured to split the horizontal linear polarization from the vertical polarization. The half waveplate 36 is configured to rotate incident linear polarization by 45°. The detection unit 33 further comprises four focusing lenses 37 for focusing the QKD signal pulses 4 on respective photon counters 38. The optical receiver 1 further comprises a second detection unit 34, which comprises a focusing lens 37 and a photodetector 34a, for detecting the base signal 5. In this setup, after being split be the dichroic mirror both the base signal 5 and the QKD signal pulses 4 propagate through the respective narrow band bandpass filter 32 having suitable transmission bands. In this way, a high-quality spectral filtering of the base signal 5 from the QKD signal 3 is achieved.

The optical receiver 1 further comprises two separated time taggers 39 connected to the photon counter 38 and to the detection unit 34 to provide time stamps to the detected pulses in order to synchronize in time these for further processing. In further embodiments, only one the time tagger 39 is used that is connected to both the photon counter 38 and the detection unit 34. Synchronized electric signals corresponding to the detected QKD signal pulses 4 and the base signal 5 are then sent to the controller 6 for further processing. In this embodiment, the controller 6 is configured as a computer. In further embodiments, the controller 6 is configured as an FPGA or other programmable chip.

Figure 4:
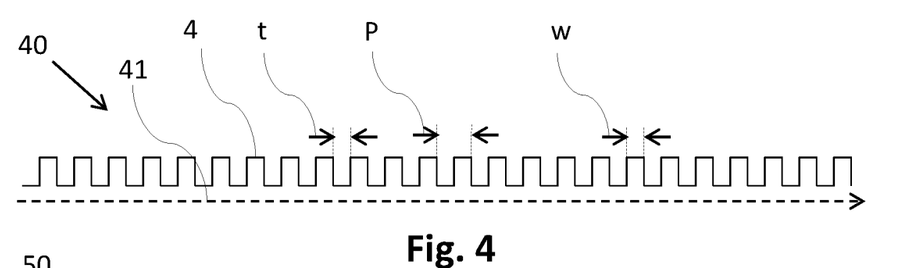
FIG. 4 shows a schematic illustration of a known QKD pulse stream.

FIG. 4 shows a schematic illustration of a known QKD pulse stream 40.

In FIG. 4, a common QKD pulse stream 40 of QKD signal pulses 4 is shown plotted on a horizontal time or distance axis 41. All QKD signal pulses 4 have a similar quantum state of the same amplitude, i.e., a number of photons. Such QKD signal pulses 4 could be encoded by polarization, e.g., according to the BB84 protocol, or by another quantum system such as orbital angular momentum. For simplicity of this illustration, the pulses are shown as rectangles, which have a pulse width w of half a period or pulse interval P, so that they are spaced apart from each other by the separation time t. A duty cycle in this case would be 0.5 (i.e., separation time t divided by the pulse interval P). However, in more realistic cases, the duty cycle can be only 1/1000, and the pulse width w of the QKD signal pulses 4 very small compared to their pulse interval P.

Figure 5:
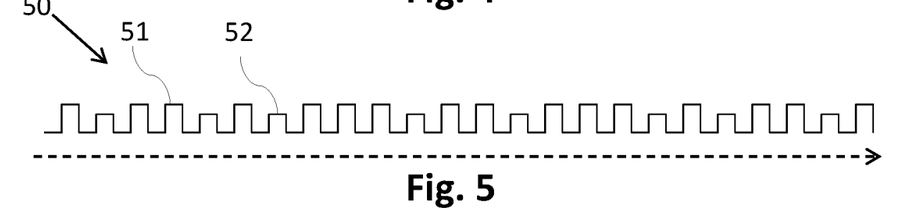
FIG. 5 shows a schematic illustration of a further known QKD pulse stream.

FIG. 5 shows a schematic illustration of a further known QKD pulse stream 50.

In FIG. 5, a QKD pulse stream 50 using a decoy protocol is shown. A decoy protocol is known to improve the security of a QKD link. The QKD pulse stream 50 comprises first QKD signal pulses 51 having a first amplitude, i.e., level of numbers of photons and second QKD signal pulses 52 having a second amplitude different from the first amplitude. In this case, the first pulses 51 have a higher amplitude, i.e., mean number of photons, than the second pulses 52.

Figure 6:
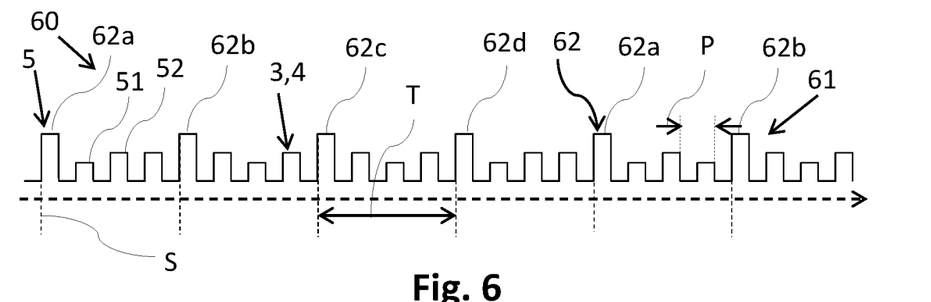
FIG. 6 shows a schematic illustration of a QKD pulse stream for quantum communication according to a further embodiment of the invention.

FIG. 6 shows a schematic illustration of a QKD pulse stream 60 for quantum communication according to a further embodiment of the invention.

The QKD pulse stream 60 shown in FIG. 6 comprises QKD encoded pulses 61 arranged in predetermined equal pulse intervals P. The QKD encoded pulses 61 comprise marker pulses 62 spaced apart at a predetermined marker time period T.

QKD signal pulses 4 are arranged between the marker pulses 62. The marker time period T is thus the pulse interval P multiplied by one plus the number of QKD signal pulses 4, i.e., T=P*(number of QKD signal pulses 4+1).

The marker pulses 62 have at least one first level of a mean number of photons different than a level of the mean number of photons of the QKD signal pulses 4. In this case, the number of photons of the marker pulses 62 is higher than the mean number of photons of either of the first or second QKD signal pulses 51, 52 of the decoy states. In further embodiments, the number of photons of the marker pulses 62 is lower than or about the same as the mean number of photons of either of the first or second QKD signal pulses 51, 52 of decoy states or a standard QKD signal pulse 4, as shown, e.g., in FIG. 4.

The base signal 5 thus comprises marker pulses 62 that are temporally spaced apart from each other by the predetermined marker time period T and interspersed into the QKD signal 3 such that the marker pulses 62 and the QKD signal pulses 4 form a QKD encoded pulse stream 60 comprising QKD encoded pulses 61 having predetermined equal pulse intervals P. The mean number of photons of the marker pulses 62 is different, i.e., higher in the present embodiment, from the mean number of photons of the QKD signal pulses 4.

The marker pulses 62 comprise at least first marker pulses 62a having a first polarization state and second marker pulses 62b having a second polarization state different from the first polarization state. In the present embodiment, the marker pulses 62 further comprise third marker pulses 62c having a third polarization state and fourth marker pulses 62d having a fourth polarization state. The first, second third and fourth polarization states are mutually different from each other and are configured according to the BB84 as horizontal (e.g., 0°), vertical (90°), plus (+45°), minus (−45°), as described above. This means, the first marker pulse 62a is linearly polarized in the horizontal direction, the second marker pulse 62c is linearly polarized in the vertical direction (90°), the third marker pulse 62c is linearly polarized in the plus direction (+45°), and the fourth marker pulse 62d is linearly polarized in the minus direction (−45°). It is understood that other encoding schemes such as the orbital angular momentum could be used for this encoding. This allows for analyzing the disturbances on the communication channel 10 for each polarization separately.

Figures 7, 8:
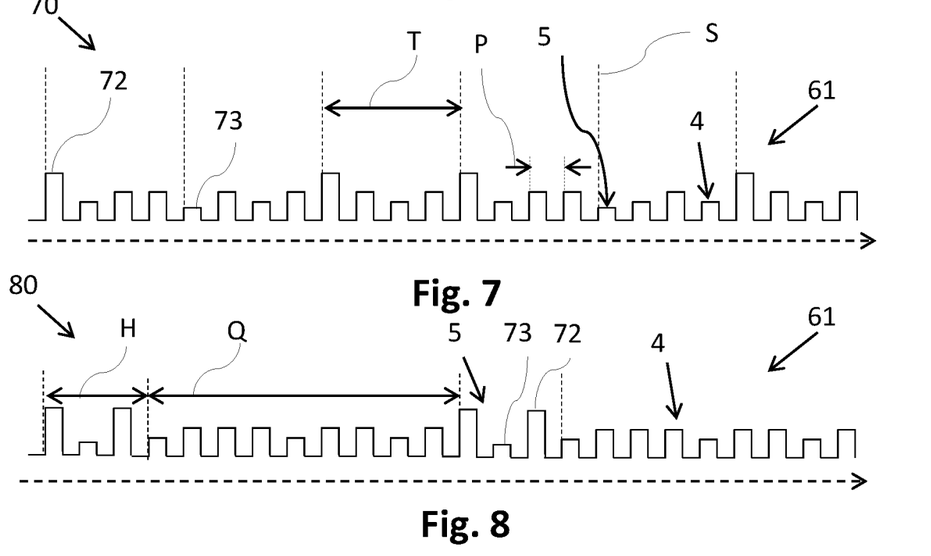
FIG. 7 shows a schematic illustration of a QKD pulse stream for quantum communication according to a further embodiment of the invention.
FIG. 8 shows a schematic illustration of a QKD pulse stream for quantum communication according to a further embodiment of the invention.

FIG. 7 shows a schematic illustration of a QKD pulse stream 70 for quantum communication according to a further embodiment of the invention;

The marker pulses 72, 73 comprise high-intensity marker pulses 72 and low-intensity marker pulses 73. It can be seen in FIG. 7 that the mean number of photons of the high-intensity marker pulses 72 is higher than the mean number of photons of the QKD signal pulses 4. The mean number of photons of the low-intensity marker pulses 73 is lower than the mean number of photons of the high-intensity marker pulses 72. In this embodiment, the mean number of photons of the low-intensity marker pulses 73 is even lower than the mean number of photons of the QKD signal pulses 4. In further embodiments, the mean number of photons of the low-intensity marker pulses 73 is about the same as the mean number of photons of the QKD signal pulses 4. The high- and low-intensity marked pulses 72, 73 can be combined with the polarization encoding of the marker pulses 62a-62d as described with relation to FIG. 6. The occurrence of the high-intensity pulses 72 and low-intensity pulses 73 are selected as random. In further embodiments, the occurrence is defined in a predetermined pattern.

In this embodiment, the marker pulses are spaced apart by the marker time period T, which is, in this case, four times the pulse interval P. In further embodiments, the marker pulses 62, 62a-62d, 72, 73 are spaced apart from each other by a time period T according to a pseudo-random sequence. Such a pseudo-random sequence could be based on digits of 10 times the Greek pi, or a multiple of them such that the first marker pulse would be arranged after 30 photons, the second marker pulse after 10 photons, the third after 40 photons, etc., but is not limited to this sequence.

FIG. 8 shows a schematic illustration of a QKD pulse stream 80 for quantum communication according to a further embodiment of the invention;

FIG. 8 shows a pulse stream 80, in where the base signal 5 and the QKD signal pulses 4 are arranged in a sequence of a header prior to a QKD package Q. The header H comprises the marker pulses 72, 73 and the QKD package Q comprises the QKD signal pulses 4.

In FIGS. 7 and 8, a time base S is indicated that provides a basis for synchronization of the pulses using, e.g., a time-tagger.

Figure 9:
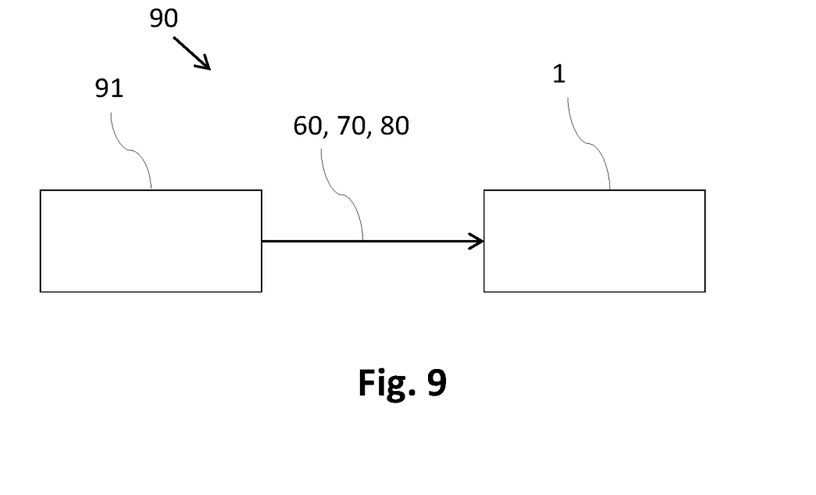
FIG. 9 shows a schematic illustration of a QKD system for quantum communication according to a further embodiment of the invention.

FIG. 9 shows a schematic illustration of a QKD system 90 for quantum communication according to a further embodiment of the invention.

The QKD System 90 for quantum communication shown in FIG. 9 comprises an inventive optical receiver 1, e.g., one of the optical receivers 1 as described above or further below in this section, and an optical transmitter 91. The optical transmitter is configured to emit the inventive QKD encoded pulse stream 60, 70, 80, in particular, the QKD pulse stream 60, 70, 80 as described with relation to FIGS. 6, 7 and 8.

Figure 10:
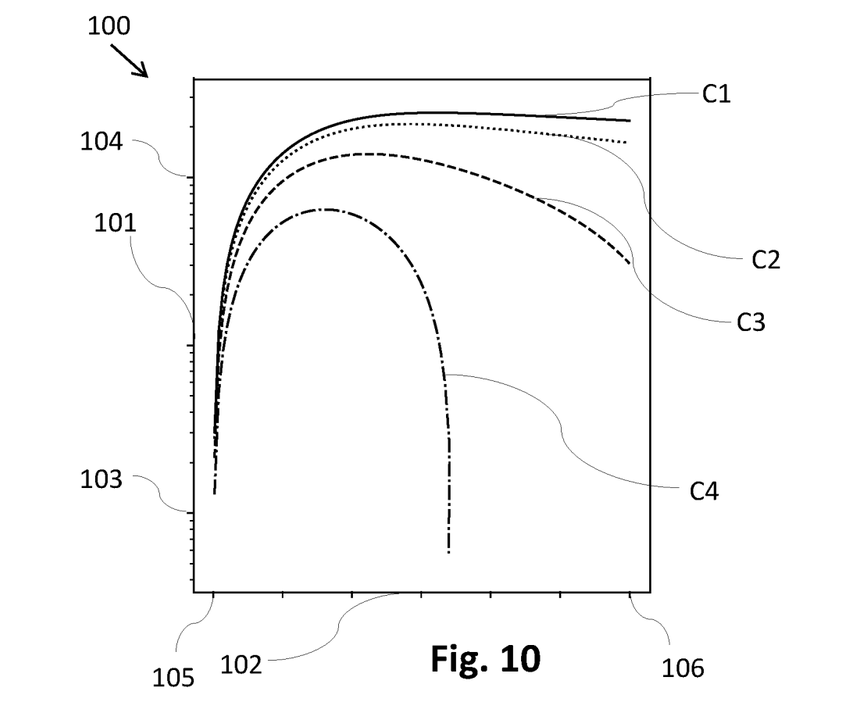
FIG. 10 shows a diagram plotting a simulated key rate as a function of the time gate according to a first set of parameters.
Figure 11:
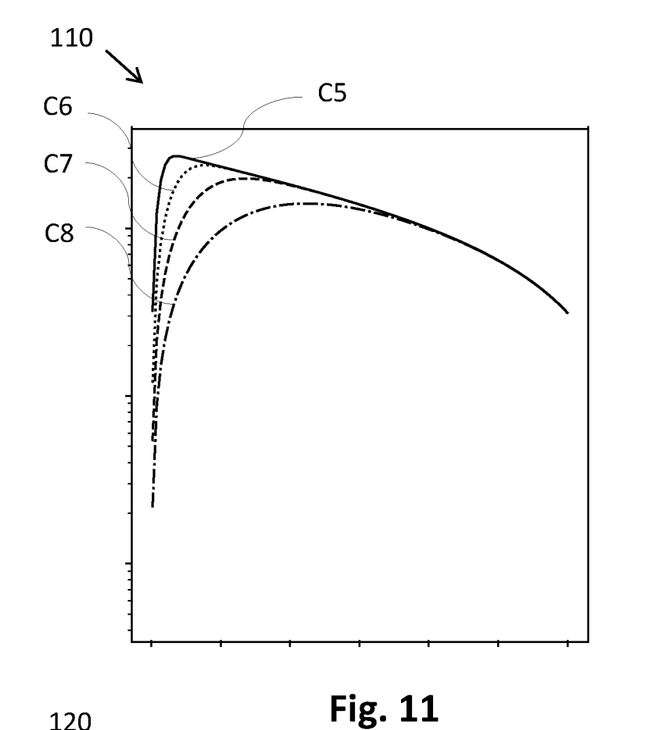
FIG. 11 shows a plotting a simulated key rate as a function of the time gate according to a second set of parameters.
Figure 12:
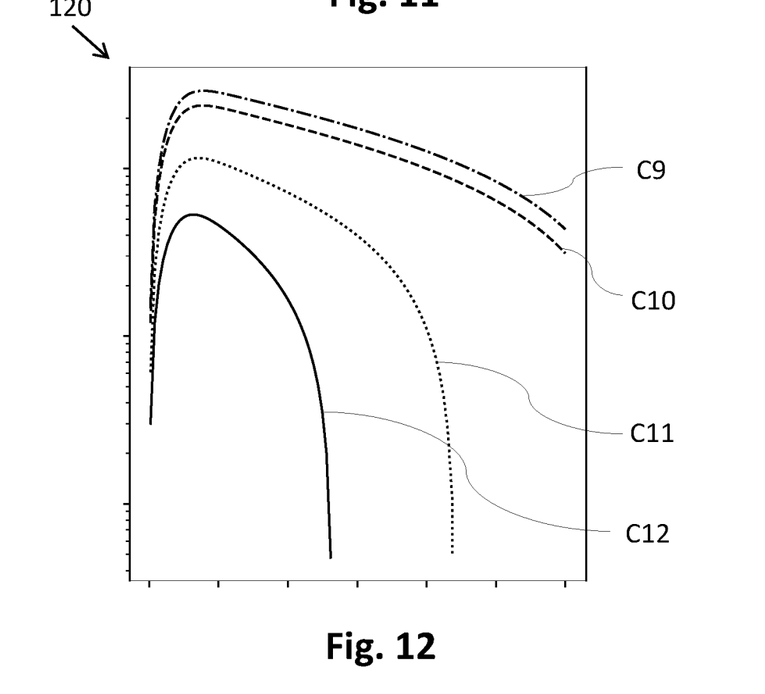
FIG. 12 shows a diagram plotting a simulated key rate as a function of the time gate according to a third set of parameters.

FIGS. 10 to 12 show diagrams plotting a simulated key rate as a function of the time gate according to a first set of parameters;

The diagrams 100, 110, 120 show simulation results, which provides a base for the determination of the width of the time gate for the method and the receiver of the invention. These simulation results are based on an analytical formula published by H-K Lo et al. "Decoy State Quantum Key Distribution" 2005, Phys. Rev. Lett. 94, 230504, arXiv: quant-ph/0411004", which considers the 8884 QKD protocol with decoy states.

In the diagrams 100, 110, 120, a normalized key rate is plotted on the vertical axis 101 as a function of the normalized width W of the time gate on the horizontal axis 102. The key rate is normalized by dividing it by the repetition rate, i.e., e.g., $10^{-3}$ means that 1 photon in every 1000 contributes to the key, and the width of the time gate is normalized by the period of the source (e.g., if the source emit a photon every nanosecond, i.e., e.g., a gate width of 0.1 corresponds to 0.1*1 ns=0. lns. In the diagrams 100, 110, 120, the normalized key rate is plotted from about a first value 103 of approximately $10^{-5}$ to about a second y-value 104 of approximately $10^{-3}$ in a logarithmic scale. The normalized width of the time gate is plotted from about a first x-value 105 of 0 to about a second x-value 106 of 0.30 on a linear scale.

As parameters, the normalized pulse width, i.e., the pulse width w divided by the period P of the source, the mean photon number per pulse and the normalized dark counts, i.e., the dark counts per second divided by the repetition rate of the source, of the detector 2 have been used for the simulation.

Diagram 100 shows the results for a fixed normalized pulse width of 0.2 and mean photon number of 0.5 by varying the normalized dark counts in curves C1 to C4 from 0.001 to 0.01. Diagram 110 shows the results for fixed normalized dark counts of 0.005 and mean photon number of 0.5 by varying the normalized pulse width in curves C5 to C8 from 0.02 to 0.2. Diagram 120 shows the results for fixed normalized dark counts of 0.005 and normalized pulse width of 0.05 by varying the mean photon number of in curves C9 to C12 from 0.1 to 1.

The following table provides the parameter set for the plotted curves C1-C12

| Curve | Normalized pulse width | mean photon number | Normalized dark counts |
|---|---|---|---|
| C1 | 0.2 | 0.5 | 0.001 |
| C2 | 0.2 | 0.5 | 0.002 |
| C3 | 0.2 | 0.5 | 0.005 |
| C4 | 0.2 | 0.5 | 0.01 |
| C5 | 0.02 | 0.5 | 0.005 |
| C6 | 0.05 | 0.5 | 0.005 |
| C7 | 0.1 | 0.5 | 0.005 |
| C8 | 0.2 | 0.5 | 0.005 |
| C9 | 0.05 | 0.1 | 0.005 |
| C10 | 0.05 | 0.2 | 0.005 |
| C11 | 0.05 | 0.5 | 0.005 |
| C12 | 0.05 | 1 | 0.005 |

Figure 13:
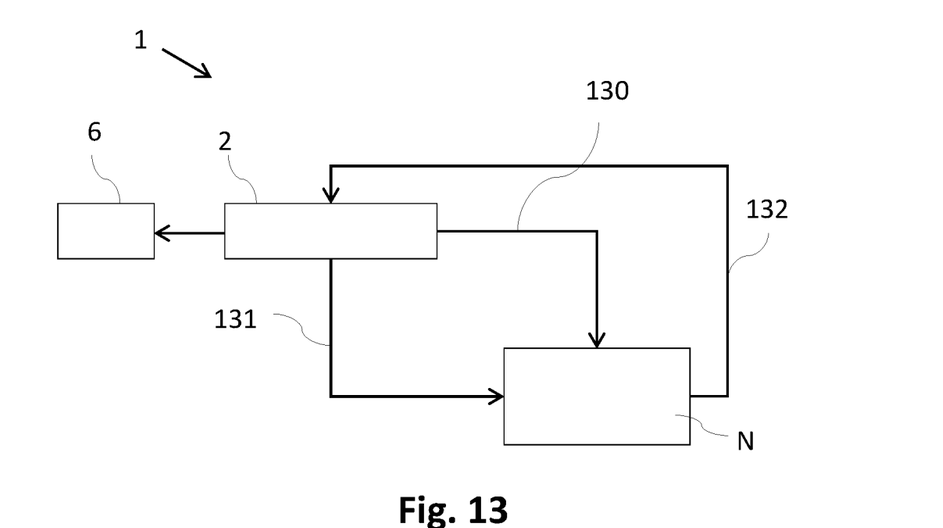
FIG. 13 shows a schematic illustration of an optical receiver for quantum communication according to a further embodiment of the invention.

FIG. 13 shows a schematic illustration of an optical receiver 1 for quantum communication according to a further embodiment of the invention.

The optical receiver 1 shown in FIG. 13 comprises a network N. The neural network N is configured to determine the width W of the time gate G based on a QBER and the base signal 5. Therefore, in this embodiment, the detector 2 feeds the neural network N by the QBER on transmission 130 and by the base signal 5 indicating the background optical noise by transmission 131. The neural network provides the time width W of the time gate G and returns it to the detector 2 by transmission 132. Thus, in this embodiment, the step of determining the width W of the time gate G is performed by the neural network N. All the remaining data including the base signal 5 and the QBER are sent to the controller 6 for further processing.

Figure 14:
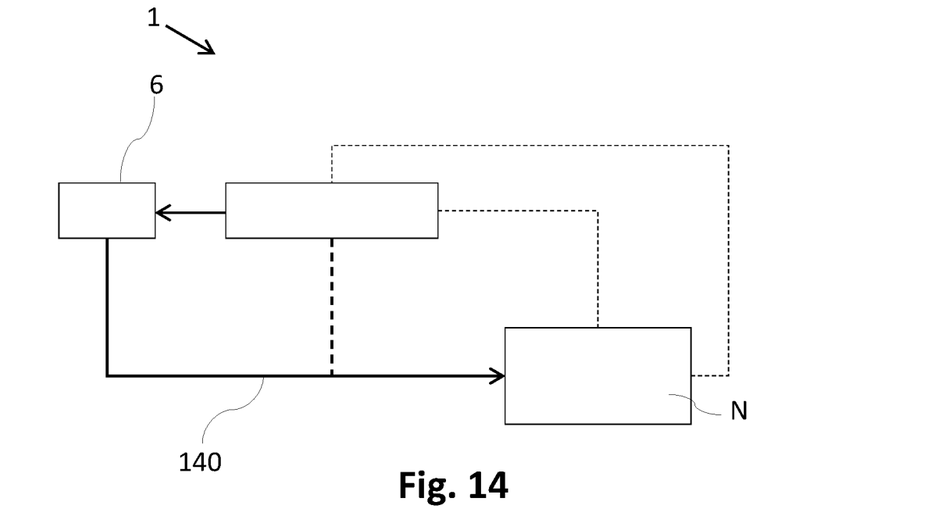
FIG. 14 shows a schematic illustration of an optical receiver for quantum communication according to a further embodiment of the invention.

FIG. 14 shows a schematic illustration of an optical receiver 1 for quantum communication according to a further embodiment of the invention.

In this embodiment of the optical receiver 1, the actual key rate of the obtained QKD signal pulses 4 is obtained measuring the key rate. The determined key rate together with the base signal 5 indicating the background noise and the QBER are then fed into the neural network N by transmission 140 for training the neural network N.

The systems and devices described herein may include a controller, such as controller 6, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 optical receiver
2 detector
3 QKD signal
4 QKD signal pulse
5 base signal
6 controller
30 optical filter unit
31 dichroic beam splitter
32 bandpass filter
33 first detection unit
34 second detection unit
34a photodetector
35 polarizing beam splitter
35a non-polarizing beam splitter
36 half-waveplate
37 lens
38 photon counter
39 time tagger
40 classic QKD encoded pulse stream
41 time/distance axis
50 decoy state QKD encoded pulse stream
51 first QKD signal pulse
52 second QKD signal pulse
60 QKD encoded pulse stream
61 QKD encoded pulses
62, 62a-d marker pulse
70 QKD encoded pulse stream
72 high-intensity marker pulse
73 low-intensity marker pulse
80 QKD encoded pulse stream
90 QKD system
91 optical transmitter
100 diagram
101 horizontal axis
102 vertical axis
103 first y-value
104 second y-value
105 first x-value
106 second x-value
110 diagram
120 diagram
130 transmission for transmitting base signal
131 transmission for transmitting QBER 132 transmission for transmitting the width of the time gate
140 transmission for transmitting training parameters
h horizontal linear polarization state
m −45° linear polarization state
p +45° linear polarization state
W pulse width
t separation time between two QKD encoded pulses
V vertical linear polarization state
C1-C12 curves
G time gate
H header
P pulse interval
Q QKD package
S time base for synchronization
T timer period between marker pulses
W width of the time gate

The invention claimed is:

1. A method for quantum communication, comprising:
obtaining, by a detector, a base signal, wherein the base signal includes an indication of a background optical noise of a communication channel;
determining, based on the obtained base signal, a value for a width of a time gate;
applying to the detector the determined width of the time gate; and
obtaining a quantum key distribution (QKD) signal comprising QKD signal pulses sent through the communication channel by applying the determined width of the time gate for filtering the background optical noise.

2. The method according to claim 1, further comprising:
determining a quantum bit-error-rate, (QBER) of the communication channel based on the obtained base signal; and
wherein determining the width of the time gate is based on the determined QBER.

3. The method according to claim 2,
wherein the step of determining the width of the time gate is performed by a neural network; and
further comprising inputting the base signal indicating the background noise and the QBER into the neural network for training the neural network.

4. The method according to claim 3, further comprising:
determining an actual key rate of the obtained QKD signal pulses; and
inputting the determined actual key rate into the neural network for training the neural network.

5. The method according to claim 1, wherein the step of determining the width of the time gate is performed by a neural network.

6. The method according to claim 1,
wherein the base signal comprises marker pulses temporally spaced apart from each other by a predetermined marker time period and interspersed into the QKD signal such that the marker pulses and the QKD signal pulses form a QKD encoded pulse stream comprising QKD encoded pulses having predetermined equal pulse intervals, and
wherein a mean number of photons of the marker pulses is different from a mean number of photons of the QKD signal pulses.

7. The method according to claim 6,
wherein the marker pulses comprise high-intensity marker pulses and low-intensity marker pulses,
wherein a mean number of photons of the high-intensity marker pulses is higher than a mean number of photons of the QKD signal pulses, and
wherein a mean number of photons of the low-intensity marker pulses is lower than the mean number of photons of the high-intensity marker pulses.

8. The method according to claim 6, wherein the marker pulses comprise at least first marker pulses having a first polarization state and second marker pulses having a second polarization state different from the first polarization state.

9. The method according to claim 6,
wherein the base signal and the QKD signal pulses are arranged in a sequence of a header prior to a QKD package, and
wherein the header comprises the marker pulses and the QKD package comprises the QKD signal pulses.

10. The method according to claim 6, wherein the marker pulses are spaced apart from each other according to a pseudo-random sequence.

11. An optical receiver for quantum communication configured to perform a method according to claim 1, comprising:
a detector configured to detect a QKD signal comprising QKD signal pulses sent through a communication channel and a base signal, wherein the base signal includes an indication of a background optical noise in the communication channel; and
a controller connected to the detector, wherein the controller is configured to:
determine, based on an obtained base signal, a width of a time gate; and
apply the time gate having the determined width to the detector to obtain the QKD signal pulses by temporal filtering.

12. The optical receiver according to claim 11,
further comprising an optical filter unit, configured to spectrally filter the base signal from the QKD signal pulses, and
wherein the detector comprises a first detection unit for detecting the QKD signal pulses and a second detection unit for detecting the base signal.

13. The optical receiver according to claim 12, wherein the optical filter unit comprises at least one of a fiber-based demultiplexer, a dichroic beam splitter or a bandpass filter.

14. The optical receiver according to claim 11,
further comprising a neural network,
wherein the neural network is configured to determine a width of the time gate based on a QBER and the base signal, input the base signal indicating the background optical noise and the QBER into the neural network for training the neural network.

15. A QKD system for quantum communication, comprising
the optical receiver of claim 11, and
an optical transmitter configured to emit a QKD encoded pulse stream for quantum communication towards the optical receiver, the QKD encoded pulse stream comprising QKD encoded pulses arranged in predetermined equal pulse intervals, wherein the QKD encoded pulses comprise:
marker pulses spaced apart at a predetermined marker time period; and
QKD signal pulses arranged between the marker pulses;
wherein the marker pulses have at least one first level of a mean number of photons different than a level of a mean number of photons of the QKD signal pulses.

* * * * *